United States Patent [19]

von Wedel

[11] Patent Number: 5,759,026
[45] Date of Patent: Jun. 2, 1998

[54] PROCESS AND APPARATUS FOR THE COOLING TREATMENT OF HOT NON HOMOGENEOUS BULK MATERIAL

[76] Inventor: Karl von Wedel, Gerberhof 5, 31535 Neustadt, Germany

[21] Appl. No.: 589,097

[22] Filed: Jan. 23, 1996

[30] Foreign Application Priority Data

Jan. 24, 1995 [DE] Germany .................. 195 02 108.8

[51] Int. Cl.$^6$ ...................................... F27D 15/02
[52] U.S. Cl. ......................... 432/77; 34/168; 34/432
[58] Field of Search ...................... 34/62, 168, 429, 34/432, 435; 432/77, 78, 79, 80

[56] References Cited

U.S. PATENT DOCUMENTS

| | | |
|---|---|---|
| 2,375,487 | 5/1945 | Newhouse . |
| 2,832,584 | 4/1958 | Plante . |
| 3,010,218 | 11/1961 | Sylvest . |
| 3,831,291 | 8/1974 | Kayatz ........................ 34/424 |
| 3,836,321 | 9/1974 | Kobayashi et al. . |
| 3,839,803 | 10/1974 | Dick ........................... 432/78 |
| 3,892,044 | 7/1975 | Kayatz . |
| 4,014,642 | 3/1977 | Helming ....................... 432/78 |
| 4,624,636 | 11/1986 | Willis .......................... 34/62 |

FOREIGN PATENT DOCUMENTS

| | | |
|---|---|---|
| 1 174 258 | 3/1959 | France . |
| 2 343 339 | 4/1974 | Germany . |
| 23 43 339 | 4/1974 | Germany . |
| 23 07 165 | 9/1974 | Germany . |
| 1 301 758 | 1/1973 | United Kingdom . |

*Primary Examiner*—Noah P. Kamen
*Attorney, Agent, or Firm*—Flynn, Thiel, Boutell & Tanis, P.C.

[57] ABSTRACT

In a process for the coating treatment of hot, non-homogeneous bulk material using a grate cooler having a conveyor grate for conveying the bulk material, separation of the bulk material is effected in accordance with grain fractions which are subjected to further treatment separately. All the bulk material which is delivered on to the conveyor grate is pre-cooled in a common bulk material bed to a given temperature. The material is graded into a plurality of grain fractions downstream of the conveyor grate, and at least individual grain fractions are separately post-cooled.

18 Claims, 3 Drawing Sheets

5,759,026

PROCESS AND APPARATUS FOR THE COOLING TREATMENT OF HOT NON HOMOGENEOUS BULK MATERIAL

FIELD OF THE INVENTION

The present invention concerns a process and an apparatus for the cooling treatment of hot, non-homogeneous bulk material in a grate cooler having a conveyor grate which conveys the bulk material. The bulk material is separated according to grain fractions which are subjected to further treatment separately. The present invention may be used for the cooling treatment of bulk materials which are roasted or fired in a rotary furnace, such as cement clinker or the like.

Hereinafter the term 'cooling treatment' is used to denote a procedure which extends from delivering the hot bulk material on to the entry side of the conveyor grate to the discharge of the finished material. The procedure can also include separation on the basis of grain fractions, breaking up oversize grain and the like.

BACKGROUND OF THE INVENTION

An operating procedure for the cooling treatment of hot bulk materials provides that the bulk materials are cooled to a desired average final temperature as they pass over the conveyor grate in a common bulk material bed, possibly broken up, and discharged. In that procedure, the amount of combustion air which is required for combustion in the rotary furnace is generally heated in a front, hot part of the grate cooler, with the bulk material being pre-cooled at the same time. The air which is used in the rear, cooler part for post-cooling of the bulk material is also heated, but it is exhaust air and has to be utilized elsewhere or disposed of. The effectiveness of the grate cooler is measured by the extent to which it is possible to heat up both the combustion air and also the exhaust air, which is equivalent to a small amount of cooling air for a given final temperature of the cooled bulk material.

A peculiarity of bulk materials which are fired in rotary furnaces is the non-homogeneous grain distribution thereof. A cement clinker has a grain distribution ranging from dust up to crust fragments involving edge lengths of about 2 meters. Other cooling processes, for example using a shaft-type cooler with a counter-flow cooling mode of operation, have been defeated by that very wide range of grain distribution. The cooling medium, generally air, flows through the course grain at one location while the fine grain trickles uncooled through the bulk material fill at another location. In consideration of such problems, shaft-type coolers are restricted to cooling substantially homogeneous bulk material.

A grate cooler has hitherto been considered the superior procedure for the cooling treatment of non-homogeneous bulk materials. However, the different cooling performance in respect of the finer components of the bulk material on the one hand, and the coarser components on the other hand, results in the bulk material being cooled down in an irregular fashion. As a result at the end of the cooling treatment, under some circumstances the finer components have already been cooled down below their final temperature, while the temperature of coarser components may still be above the desired final temperature. This means that the aim of the grate cooler, namely, cooling the bulk material uniformly to the desired final temperature with the minimum amount of cooling air, is not fulfilled in an optimum fashion. In many cases, the component involving larger coarse grain is still in a glowing-red condition in the interior thereof at the end of the conveyor grate so that the breaking operation results in the formation of glowing high temperature pieces. The high temperature pieces make it necessary for the bulk material to be transported using conveyor means consisting of steel. Steel conveyors are technically expensive, instead of, for example, rubber. Attempts have already been made to improve final cooling of the coarse grain by an intermediate breaking operating using hammer-type or roller-type breakers, with the broken material being subjected to final cooling in a downstream-disposed grate portion. In every case, all of the bulk material is subjected to the post-cooling procedure, although the fine components are already sufficiently cooled. A further disadvantage of the intermediate breaking operation is that the bulk material is mixed up again, and thus the temperature profile which has been previously attained with a cooler bottom layer and a hotter top layer is disturbed. Thusly, the recovery of heat in the downstream-disposed grate portion is adversely affected.

A further attempt has also already been made by using different grate cooler design configurations to take into account the differences in grain size by adopting a procedure whereby fine grain and coarse grain are separated from each other and are thereafter subjected to further treatment separately.

U.S. Pat. No. 3,831,291 already discloses a process in which the oversize grain of the hot bulk material from the furnace is reduced in size by breaking rollers and the bulk material is supplied with air in the front, hot part of the grate cooler so that the fine grain forms an upper layer on the coarse grain. The bulk material is again allowed to become mixed in the rear part of the grate cooler. However, the operation of breaking up the hot clinker from the furnace has hitherto failed to achieve success due to the problem of the breaking tool being inadequate, as that tool is subjected to an extremely high thermal loading. In addition, in spite of the more or less substantial separation of fine grain and course grain in the front part of the grate cooler, the bulk material is completely mixed up again at the end of the entire cooling section so that the disadvantage which has already been described hereinbefore is encountered. The disadvantage being certain fine components of the bulk material are already cooled down to a temperature below the desired final temperature while the temperature of the coarse components is possibly above the final temperature.

German published specification (DE-AS) No. 23 43 339 discloses a process in which the fine grain is blown upwardly by the cooling air in the first, hot portion of the grate cooler and is moved laterally to an overflow means, so that it can be definitively separated from the coarse grain and cooled in a specific type of cooler which is more suitable for the fine grain. However, such an apparatus is extremely complicated in respect of its structure and extremely demanding in terms of the amount of space that it requires, so that the possible uses thereof are restricted. In addition, the high air speed required for blowing the fine material out from the course material is detrimental to heat recovery.

All the above-described processes involving separation of the bulk material fractions at the beginning of the grate have the common aspect that the temperature profile in the bulk material fill is disturbed and the recovery of heat in the recovery zone is reduced.

German published specification (DE-AS) No. 23 07 165 discloses a process in which fine grain is separated by sieving from coarse grain in the entire grate region and is cooled in a cooling device which is disposed below the grate. The grate has a breaking device either at the grate end or in the grate center. In this procedure, the cooling air is successively passed first through the lower bulk material bed and thereafter through the upper bulk material bed. As cooling of the fine component and the coarse component are not actually decoupled from the operating procedure point of view, this arrangement also cannot achieve optimum recovery of heat.

SUMMARY OF THE INVENTION

An object of the present invention is to provide a process for the cooling treatment of hot, non-homogeneous material, which provides an improved level of effectiveness and efficiency.

Another object of the present invention is to provide a process for the cooling treatment of hot, non-homogeneous bulk material, involving a rationalized, improved operating procedure so as to enhance the results of the process.

Still another object of the present invention is to provide an apparatus for the cooling treatment of hot, non-homogeneous bulk material having lower structural cost while providing enhanced operating results.

In accordance with the invention the foregoing and other objects are attained by the invention as set forth herein.

The process according to the present invention thus provides that all the bulk material which is delivered onto the conveyor grate is pre-cooled in a common bulk material bed. The bulk material is graded into a plurality of grain fractions downstream of the conveyor grate. At least individual ones of those grain fractions are separately subjected to post-cooling in respective cooling devices which are particularly suitable for the respective grain fractions.

It has been found that by virtue of an improved air feed procedure with modern cooling grates, it is possible to achieve a good layering effect and temperature distribution within the bulk material. The fine grain no longer has a tendency to flow and premature separation of the fine grain from the coarse grain is no longer necessary. In that way it is possible to avoid the high level of structural expenditure which is required for early separation and separate post-treatment of the fine component and the coarse component. In addition, each procedural intervention in the front, hot part of the grate cooler, which particularly critically reacts to such intervention operations, avoids a disadvantageous influence on the recovery of heat.

The bulk material is separated into a plurality of grain fractions at the discharge end of the grate cooler so that it becomes possible for at least individual grain fractions to be subjected to post-cooling in post-cooling devices. The post-cooling devices are respectively particularly suitable for each individual grain fraction. Larger grain fractions can possibly be broken down. In the present invention, shaft-type coolers can be used as the post-cooling devices. Shaft-type coolers are highly suitable for cooling the coarse component which has been freed of the fine component and which is possibly graded on the basis of grain fractions. Shaft-type coolers represent comparatively inexpensive containers in which the coarser bulk material is accommodated during the residence time required for the cooling operation.

A preferred embodiment of the process of the present invention provides that the bulk material is pre-cooled to such an extent that a fine component, which is defined by a maximum grain size, has reached a desired final temperature, and at least that fine component is separated off as the smallest grain fraction and discharged as the finished material. A breaking operation may be performed on the fine component of the bulk material. The coarse component is preferably post-cooled in a shaft-type cooler in a counter-flow mode. The course component is broken up by breaking tools which are disposed in the shaft-type cooler. Shaft-type coolers, in which the discharge of bulk material is effected by way of breaking rollers which are disposed in the lower region of the shaft and on which the column of bulk material rests, have proven themselves successful for the cooling of coarse-grain bulk material which has been freed of the fine component.

A preferred feature of the invention also provides for separating the coarse component into a plurality of grain fractions after the fine component has been sifted or sieved off, and then post-cooling those grain fractions individually in associated shaft-type coolers or possibly also other suitable cooling devices.

The post-cooling devices may also be conveyor grates in which the bulk material is cooled in a transverse flow mode. Another possibility for cooling is again delivering at least individual grain fractions which are to be post-cooled onto the bulk material bed of the main conveyor grate and then subjecting them to post-cooling as will be described hereinafter by reference to a specific example. In that respect there is the possibility of breaking up those grain fractions before they are delivered onto the main conveyor grate by means of suitable breaking tools suitable breaking tools include roller-type or hammer-type breakers.

The apparatus according to the invention for the cooling treatment of hot, non-homogeneous bulk material, includes a grate cooler with conveyor grate and means for separating the bulk material by grain fractions. Arranged downstream of the conveyor grate is a sieve or sifter device for grading the bulk material into a plurality of, that is to say at least two, grain fractions. Post-cooling devices for at least respective individual ones of the graded grain fractions are arranged downstream of the sieve arrangement.

As already stated, the post-cooling devices may be shaft-type coolers, cooling grates or also so-called G-coolers, in which the bulk material slips through a grid of cooling air pipes. A particular configuration of the apparatus according to the invention provides that the main conveyor grate itself is used as the post-cooling device, while suitable means are provided for feeding the grain fractions to be post-cooled to the bulk material bed of the main conveyor grate again.

Preferably, discharge of the different separated grain fractions is effected by way of a common discharge conveyor which receives the grain fractions after their treatment and discharges them jointly.

Further objects, features and advantages of the present invention will now be described with reference to the preferred embodiments.

DESCRIPTION OF PREFERRED EMBODIMENTS

Figure 1:
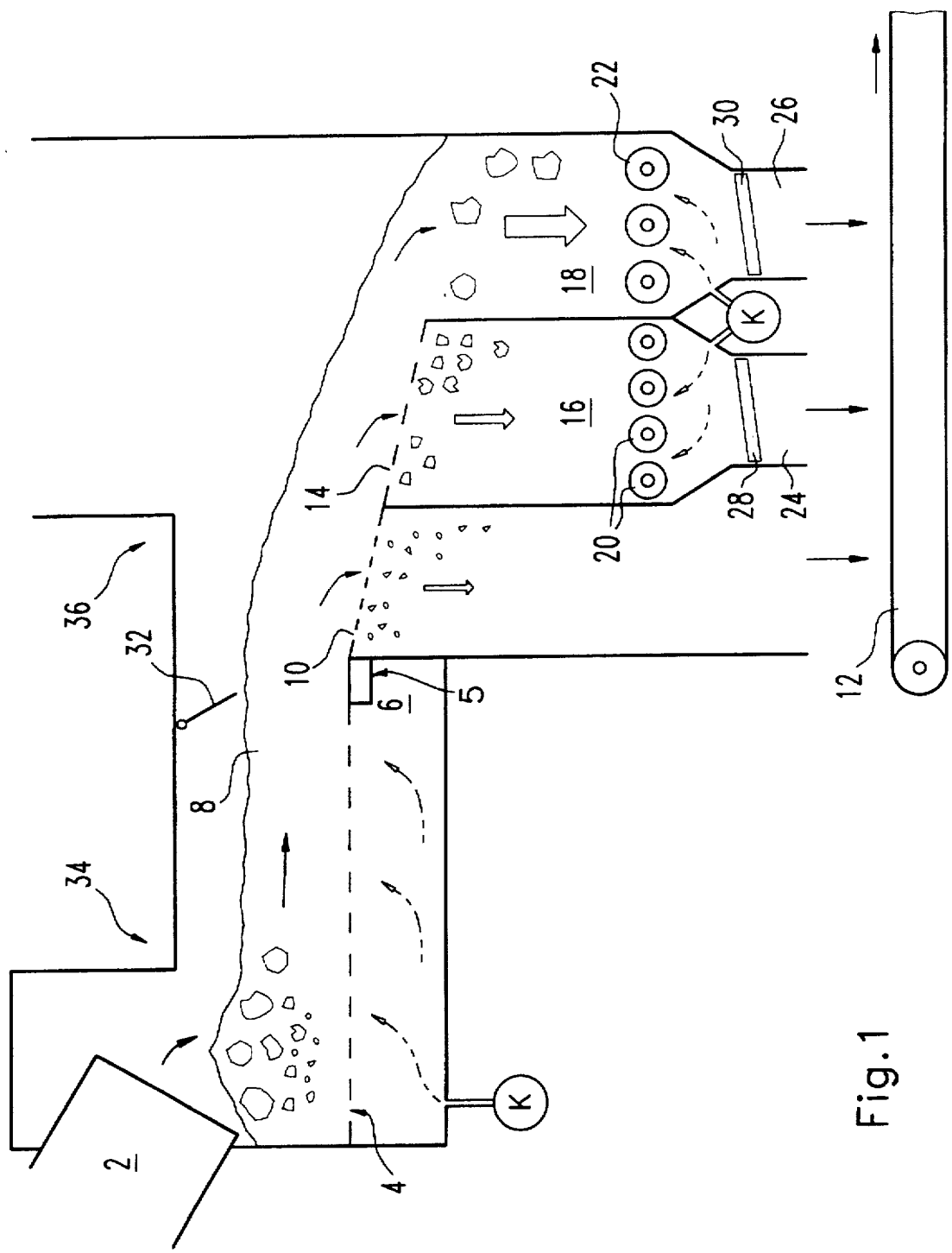
FIG. 1 is a diagrammatic view of a cooling apparatus with a conveyor grate, a sieve arrangement for grading the bulk material into a plurality of grain fractions, and two shaft-type coolers for post-cooling of coarse components.

Referring firstly to FIG. 1, shown therein is an apparatus for the cooling treatment of hot, non-homogeneous bulk material. The apparatus is of a substantially conventional structure in its front part which is at the left in FIG. 1. A bulk material which has been roasted or fired in a rotary furnace 2, for example a cement clinker, drops on to a conveyor grate 4 powered by conveyor motor 5 and is conveyed thereby towards the right in FIG. 1. As conveyors and grates for moving material are common in this field, further discussion of the detail of these elements is not required. Arranged below the conveyor grate 4 is an air chamber 6 for feeding air to the conveyor grate 4. The air chamber 6 is supplied with compressed air (or possibly another cooling gas) by an air compressor K. The air flows through the conveyor grate 4 and the bulk material 8 resting thereon, and in so doing cools down the bulk material and is itself heated up. The heated cooling air is fed to the rotary furnace 2 as preheated combustion air in a conventional manner.

In a common bulk material bed which contains all sizes of grain fractions, the bulk material 8 is cooled to such an extent that certain finer grain fractions attain their desired final temperature. Then, those fine components are separated off by being sieved off by means of a sieve 10 which is disposed downstream of the conveyor grate 4. The sieved off, fine components are fed as a finished product to a discharge conveyor device 12.

The coarse components which have not been sieved off and the temperature of which is still above the desired final temperature are again graded by means of a second sieve 14 which sifts out a grain fraction coarser than the first-mentioned sieve 10. The finer grain fraction sieved by second sieve drops into a first shaft-type cooler 16 while the coarser grain fraction drops into a second shaft-type cooler 18.

A lower region of the shaft-type cooler 16 has breaking rollers 20 on which the material to be subjected to post-cooling rests. Cooling air is supplied in the lower region of the shaft-type cooler 16 and flows in counter-flow relationship through the material which is to be subjected to the post-cooling operation.

The shaft-type cooler 18 is of a similar structure to the shaft-type cooler 16. The shaft type cooler 18 in its lower region has breaking rollers 22 on which the material which is to be post-cooled rests. Cooling air is supplied in the lower region and flows in counter-flow relationship through the material which is to be post-cooled.

The compressed air which is required for the cooling effect both in the shaft-type cooler 16 and also in the shaft-type cooler 18 is produced by an air compressor K which is common to both shaft-type coolers.

The shaft-type coolers 16 and 18 are reduced in width in a funnel-like configuration beneath the breaking rollers 20 and 22 respectively and each terminate in a feed portion 24 and 26 respectively. Arranged in each of the feed portions 24 and 26 is a respective lock device or control valve device 28 and 30. The valve devices 28, 30 respectively make it possible for the cooled and broken-up bulk material to be periodically discharged from the respective shaft-type coolers 16, 18 and delivered on to the discharge conveyor device 12.

A pivotable separating wall 32 is disposed above the bulk material bed 18 separating a hotter part 34 of the grate cooler, which is at the left in FIG. 1, from a cooler part 36 thereof, which is at the right in FIG. 1. In the hotter part 34, the amount of air required for the combustion process in the rotary furnace 2 is heated to a temperature which is as high as possible and then fed to the rotary furnace 2. The air which is heated in the cooler part 36 is discharged as exhaust air or possibly fed to another use.

It will be appreciated that the cooling apparatus illustrated in FIG. 1 is only given by way of example. It could be varied in different ways, for example, the fine component which is sieved off by means of the first sieve 10 could be again post-cooled and/or broken up. It would further be possible for the coarse component which remains after the fine component has been sieved off to be post-cooled and broken in a single shaft-type cooler. The invention also includes the possibility of grading the coarse component into more than two grain fractions and subjecting each of them separately to the post-cooling treatment.

Figure 2:
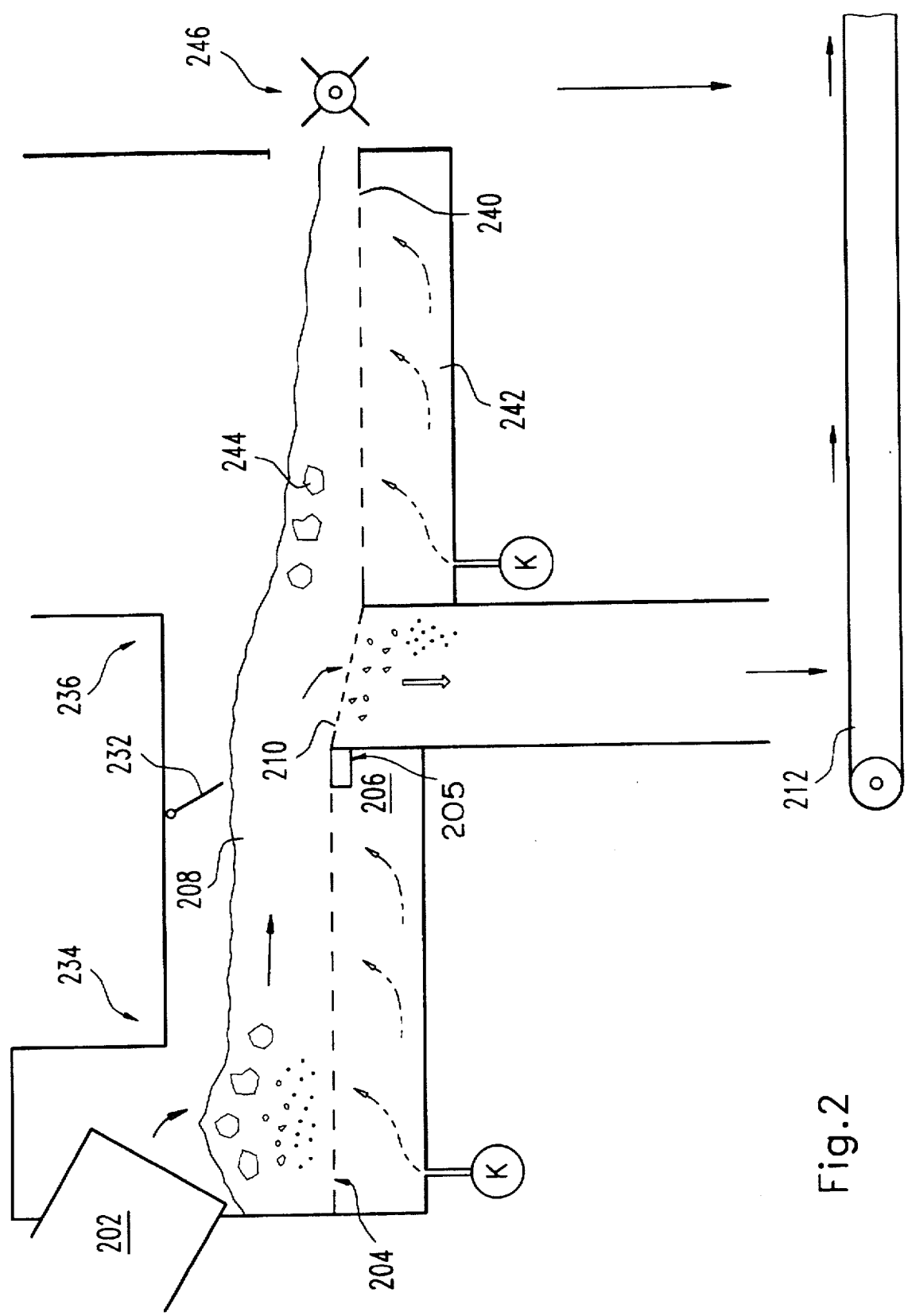
FIG. 2 is a diagrammatic view of a cooling apparatus with a conveyor grate, a sieve arrangement for sieving off a fine component, and a further downstream-disposed cooling grate for cooling of the coarse components.

FIG. 2 shows a cooling apparatus which in the front hot part 234 substantially corresponds to the part 34 in FIG. 1. Smaller components to the embodiment described above have the same reference numerals with 200 added thereto. Bulk material 208 which falls out of the firing or roasting furnace 202 is conveyed towards the right in FIG. 2 on a conveyor grate 204 powered by conveyor motor 205. The bulk material is cooled by means of cooling air supplied from the air chamber 206 to such a degree that given fine components which are defined by their maximum grain size have reached a given final temperature, preferably their final temperature which is desired from the point of view of the specific operating procedure involved. They are then sieved off by means of a first sieve 210 and passed to a discharge conveyor device 212.

The course components are fed to a downstream-disposed cooling grate 240 which is supplied with air by way of an air chamber 242 disposed therebeneath, so that the bulk material 244 which lies on the cooling grate 240 is cooled. The heated cooling air is discharged as exhaust air, or is passed to a further use. A pivotable separating wall 232 again serves to separate the left-hand side in FIG. 2, hotter part 234 from the right-hand side in FIG. 2, cooler part 236.

The coarse bulk material 244 which is post-cooled on the downstream-positioned cooling grate 240 is fed to a breaker device 246, for example a hammer-type breaker, and drops on to the discharge conveyor device 212 after being broken down in size.

Figure 3:
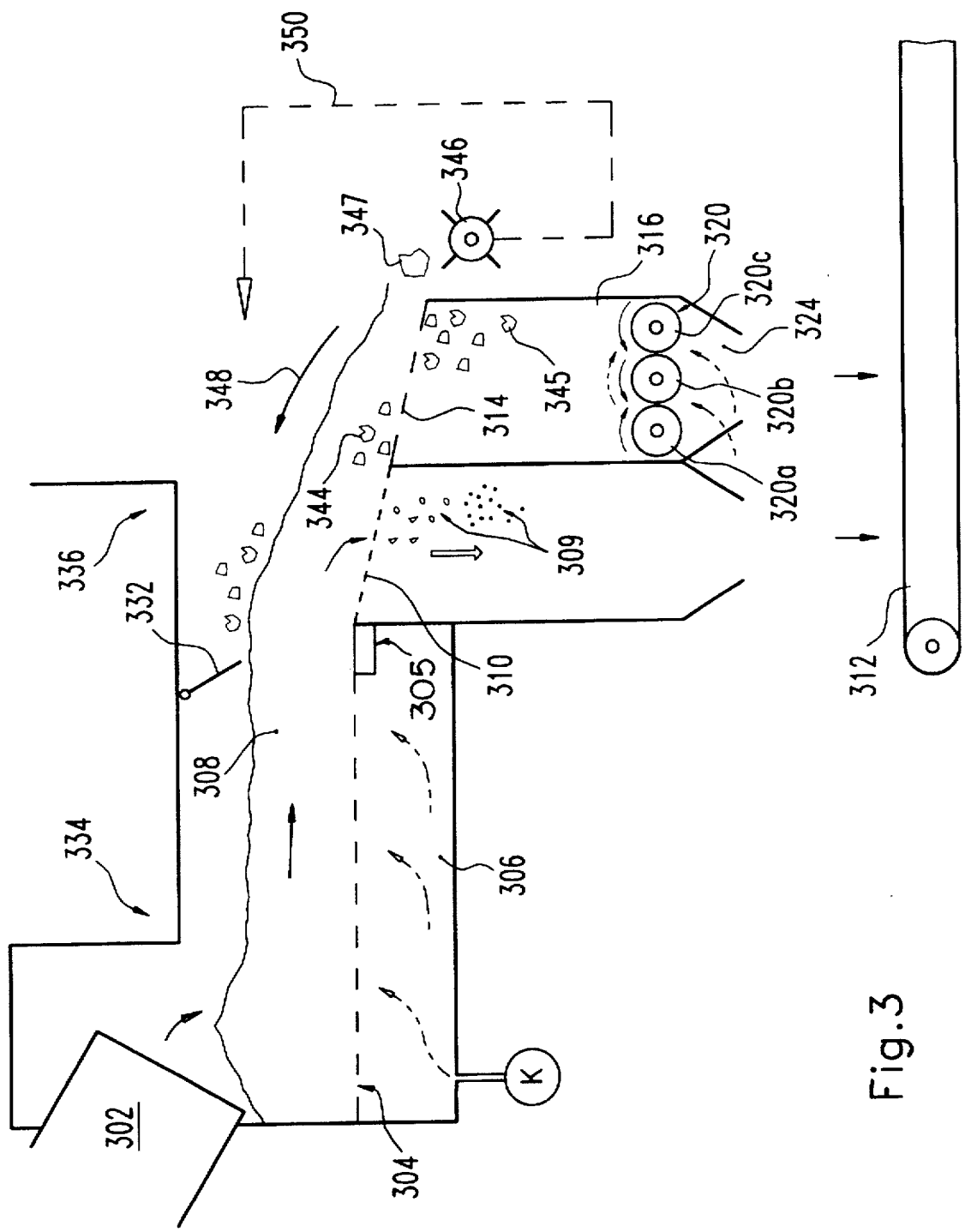
FIG. 3 is a diagrammatic view of a cooling apparatus with a conveyor grate, a sieve arrangement, and a device with which the coarse components are fed to the conveyor grate again.

FIG. 3 shows a cooling apparatus which in its essential parts again corresponds to the cooling apparatuses shown in FIGS. 1 and 2 and has corresponding reference numbers with 300 added thereto. The bulk material which is fired or burnt in the rotary furnace 302 drops onto a conveyor grate 304 and is transported towards the right in FIG. 3 on the conveyor grate 304 powered by conveyor motor 305. An air chamber 306 for supplying air to the conveyor grate 304 is arranged beneath the conveyor grate 304. The cooling air flows through the conveyor grate 304 and the bulk material 308 lying thereon so that the bulk material is cooled down. The cooling air which is heated up in the hotter part 334 is fed to the rotary furnace 302 as the air supply for combustion therein.

The bulk material 308 is cooled to such an extent that certain fine components 309 which form a first grain fraction size have reached a predetermined temperature, preferably the final temperature which is desired from the point of view of the operating procedure involved. The fine components 309 are sieved off by means of a first sieve 310 and fed to the discharge conveyor device 312.

The course components 344 are again separated into a second grain fraction size 345 and a third grain fraction size 347 by means of a second sieve 314. The second and third grain fractions are each subjected to post-cooling in respectively suitable post-cooling devices. The second grain fraction 345, which has been freed of the fine components 309 and the course components of the third grain fraction 347 and which is thus comparatively homogeneous, drops into a shaft-type cooler 316. The shaft-type cooler 316 cools the material in counter-flow relationship. The second grain fraction 345 is broken up by means of breaking rollers 320, in the manner described hereinbefore. Discharge of the material is effected by way of the outlet portion 324 on to the discharge conveyor device 312.

The third grain fraction 347 is fed to a hammer breaker 346 and is reduced in size thereby. The pieces which have been reduced in size in that way are returned again on to the bulk material bed 308. On the conveyor grate 304 for the post-cooling operation. More specifically, and, preferably, at a location of the bulk material bed at which the temperature is approximately equal to that of the returned pieces of material so that the temperature profile of the bulk material bed is maintained substantially unchanged.

Return of the material is effected, for example, by the hammer breaker 346 which throws the pieces of material back (solid line 348) or by a conveyor device (not shown) which receives the pieces of material after they have passed the hammer breaker 346 and returns them (shown diagrammatically at broken line 350). The third grain fraction which is broken down by the hammer breaker 346 and which is post-cooled on the bulk material bed passes into the shaft-type cooler 316 where it is finally cooled together with the second grain fraction, and thereafter broken up again by the breaking rollers 320 in the second shaft-type cooler.

As FIG. 3 shows, three breaking rollers indicated generally at 320a, 320b, 320c are disposed in the lower region of the shaft-type cooler. Discharging pairs of breaking rollers are in each case those whose direction of rotation as considered in the gap between the pair of breaking rollers faces downwardly in the same direction. When there are three breaking rollers, with the directions of rotation specified in FIG. 3, the left-hand pair of breaking rollers 320a, 320b (the central breaking roller 320b rotates in the counter-clockwise direction) or the right-hand pair of breaking rollers 320b, 320c (the central breaking roller 320b rotates in the clockwise direction) can be selectively made into the pair of rollers which provide for discharge of the material. It is provided that the temperature of the breaking rollers or the temperature of the zones of the bulk material disposed above the rollers is measured. The temperature of the breaking rollers is related to the temperature of the associated zone of bulk material preferably, the material from the cooler zones is discharged by way of the associated pair of rollers.

Individual grain fractions are defined, by way of example, a value of 30 to 35 cm is specified for the first grain fraction, and a value of 100 cm is specified for the second grain fraction. The third grain fraction contains the grain sizes which are above 100 cm.

A separating wall 322 again serves to separate the hotter part 334 of the grate cooler, which is at the left in FIG. 3, from the cooler part 336 which is at the right in FIG. 3.

A common factor in all embodiments is that a given fine component which is defined for example by a maximum grain size is cooled to a predetermined final temperature, preferably the final temperature which is desirable from the point of view of the operating procedure involved, and is then separated from the other, coarser and therefore hotter bulk material. Then, freed from the fine component, that coarser bulk material can be subjected to a post-cooling operation in the post-cooling devices which are respectively most suitable therefor, and possibly reducing the coarser bulk material in size.

It will be appreciated that the above-described embodiments of the process and the apparatus according to the present invention have been set forth purely by way of example and illustration thereof and that various other modifications and alterations may be made therein without thereby departing from the spirit and scope of the invention.

What is claimed is:

1. A process for the cooling treatment of hot, non-homogeneous bulk material comprising the steps of providing a grate cooler having a conveyor grate for conveying the bulk material, delivering the bulk material onto the conveyor grate to form a common bulk material bed thereon, pre-cooling the common bulk material bed, conveying the common bulk material bed on the conveyor grate through the grate cooler, separating the bulk material according to individual grain fractions of the bulk material into a plurality of grain fractions downstream of the conveyor grate, and separately post-cooling at least one of the individual grain fractions, the post-cooling of the grain fractions including the step of post-cooling the grain fractions in counter-flow relationship in a shaft-type cooler.

2. A process as set forth in claim 1, wherein the step of pre-cooling includes the step of cooling a defined fine component to a desired final temperature, and wherein the separating step includes the step of discharging at least the fine component cooled to the desired final temperature as the finished product.

3. A process as set forth in claim 2, further comprising the step of breaking the fine component into smaller components before discharging the fine component.

4. A process as set for in claim 2, further comprising the step of breaking at least one of the individual grain fractions into smaller components prior to post-cooling.

5. The process as set forth in claim 1, further comprising the step of breaking the grain fractions by breaking tools arranged in the shaft-type cooler.

6. A process for the cooling treatment of hot, non-homogenous bulk material comprising the steps of providing a grate cooler having a conveyor grate for conveying the bulk material, delivering the bulk material onto the conveyor grate to form a common bulk material bed thereon, pre-cooling the common bulk material bed, conveying the common bulk material bed on the conveyor grate through the grate cooler, separating the bulk material according to individual grain fractions of the bulk material into a plurality of grain fraction downstream of the conveyor grate, separately post-cooling at least one of the individual grain fractions, and conveying the at least one individual grain fraction on a downstream-disposed cooling grate, and wherein the step of separately post-cooling the grate fraction includes the step of the flowing a cooling gas transverse to the downstream-disposed cooling grate.

7. The process as set forth in claim 6, further comprising the step of breaking the grain fractions by breaking tools adjacent the downstream-disposed cooling grate.

8. A process as set forth in claim 7, further comprising the step of feeding the individual grain fractions which are to be post-cooled to the bulk material bed on the conveyor grate.

9. A process as set forth in claim 8, further comprising the step of breaking the individual grain fractions prior to the feeding thereof to the bulk material bed on the conveyor grate.

10. An apparatus for the cooling treatment of hot, non-homogeneous bulk material, comprising: a grate cooler with a conveyor grate; a sieve arrangement downstream of the conveyor grate for individually grading the bulk material into a plurality of separated grain fractions; and post-cooling devices arranged downstream of the sieve arrangement for post-cooling at least one of the individually graded grain fractions, the post-cooling devices including shaft-type coolers, the shaft-type coolers having means for post-cooling the grain fractions in a counter-flow relationship therein.

11. The apparatus as set forth in claim 10, further comprising breaking devices for at least one of the individually graded grain fractions arranged downstream of the sieve arrangement.

12. The apparatus as set forth in claim 10, further comprising breaking rollers arranged in the shaft-type coolers.

13. An apparatus for the cooling treatment of hot, non-homogeneous bulk material, comprising: a grate cooler with a conveyor grate; a sieve arrangement downstream of the conveyor grate for individually grading the bulk material into a plurality of separated grain fractions; and post-cooling devices arranged downstream of the sieve arrangement for post-cooling at least one of the individually graded grain fractions, the post-cooling devices including cooling grates.

14. The apparatus as set forth in claim 13, further comprising breaking tools arranged upstream of the cooling grates.

15. The apparatus as set forth in claim 13, further comprising breaking tools arranged behind the cooling grates.

16. An apparatus for the cooling treatment of hot, non-homogeneous bulk material, comprising: a grate cooler with a conveyor grate; a sieve arrangement downstream of the conveyor grate for individually grading the bulk material into a plurality of separated grain fractions; post-cooling devices arranged downstream of the sieve arrangement for post-cooling at least one of the individually graded grain fractions; and a discharge conveyor device for receiving and discharging a plurality of separately treated grain fractions.

17. An apparatus for the cooling treatment of hot, non-homogeneous bulk material, comprising: a grate cooler with a conveyor grate; a sieve arrangement downstream of the conveyor grate for individually grading the bulk material into a plurality of separated grain fractions; post-cooling devices arranged downstream of the sieve arrangement for post-cooling at least one of the individually graded grain fractions, the post-cooling devices include shaft-type coolers, means for measuring temperatures of juxtaposed zones of the bulk material disposed in one said shaft-type cooler, and means for controlling a preferred discharge of cooler zones of bulk material.

18. The apparatus as set forth in claim 17, further comprising breaking rollers arranged in the shaft-type cooler, and wherein the means for controlling the discharge of bulk material includes means for controlling the direction of rotation of the breaking rollers.

* * * * *

UNITED STATES PATENT AND TRADEMARK OFFICE
CERTIFICATE OF CORRECTION

PATENT NO. : 5,759,026
DATED : June 2, 1998
INVENTOR(S) : Karl von Wedel

It is certified that error appears in the above-indentified patent and that said Letters Patent is hereby corrected as shown below:

```
Column 8, line 51; replace "fraction" with ---fractions---.
         line 55; replace "grate fraction" with
                  ---grain fractions---.
         line 56; delete "the" (second occurrence).
         line 61; replace "7" with ---6---.
```

Signed and Sealed this

Fifth Day of January, 1999

Attest:

Attesting Officer

*Acting Commissioner of Patents and Trademarks*